United States

Bartolini et al.

[11] 3,763,311
[45] Oct. 2, 1973

[54] REDUCTION OF NON-LINEAR SPATIAL DISTORTION IN HOLOGRAPHIC SYSTEM EMPLOYING DIFFERENT WAVELENGTHS FOR RECORDING AND PLAYBACK

[75] Inventors: Robert Alfred Bartolini, Trenton; Dainis Karlsons, Pennington, both of N.J.

[73] Assignee: RCA Corporation, New York, N.Y.

[22] Filed: July 9, 1971

[21] Appl. No.: 161,105

[52] U.S. Cl............... 178/5.4, 178/5.4 CD, 350/3.5
[51] Int. Cl. ............................................. H04n 9/04
[58] Field of Search ....................... 178/5.4, 5.4 CD; 350/3.5

[56] References Cited
UNITED STATES PATENTS
3,619,025  11/1971  Hannan................................ 350/3.5

OTHER PUBLICATIONS

Meter – Magnification and Third Order Aberrations in Holography – Jour. Opt. Soc. of Amer. Volume 53 No. 8 Aug. 1965 – pp. 987–992

Leith et al.– Microscopy by Wavefront Reconstruction Jour. Opt. Soc. of Amer. Vol. 55, No. 8, Aug. 1965, pp. 981–986.

Latta– Computer–Based Analysis of Hologram Imagery and Aberrations Applied Optics/Vol. 10, No. 3, March 1971, pp. 599–608

Primary Examiner—Robert L. Griffin
Assistant Examiner—Joseph A. Orsino, Jr.
Attorney—Edward J. Norton

[57] ABSTRACT

In the recording of a Fraunhofer hologram, with any given fixed angle between the object information and reference beams, spatial non-linear distortion is minimized by properly choosing the inclination of the object information beam with respect to the recording medium as a function of the recording wavelength, the focal length of a converging lens employed in recording, the playback wavelength, and the focal length of an imaging lens employed in playback.

5 Claims, 7 Drawing Figures

PATENTED OCT 2 1973 3,763,311

Fig. 1. HOLOGRAM RECORDING

INVENTORS.
*Robert A. Bartolini* and
*Dainis Karlsons.*
BY *George J. Seligsohn*
ATTORNEY

HOLOGRAM READOUT

INVENTORS.
Robert A. Bartolini and
Dainis Karlsons.
BY George J. Seligsohn
ATTORNEY

REDUCTION OF NON-LINEAR SPATIAL DISTORTION IN HOLOGRAPHIC SYSTEM EMPLOYING DIFFERENT WAVELENGTHS FOR RECORDING AND PLAYBACK

This invention relates to a technique for reducing spatial distortion in a reconstructed hologram image and, more particularly, for reducing the non-linear spatial distortion which arises when wave energy of one wavelength is used for recording a hologram and wave energy of a different wavelength is used for reconstructing the hologram.

As is known, when a hologram of an object, such as a transparency, which has been recorded with wave energy of a first wavelength, is reconstructed with wave energy of a second wavelength, the relative size of the reconstructed hologram image, with respect to that of the object, depends upon the ratio of the first and second wavelengths. In particular, if the second wavelength is longer than the first wavelength, the reconstructed image will be magnified and if the second wavelength is shorter than the first wavelength the reconstructed image will be demagnified. Furthermore, for any set of first and second wavelengths, the magnification (or demagnification) is not the same for all corresponding points of the original object and the reconstructed image, but, rather, varies in a non-linear manner which is functionally related to the geometry of the recording and reconstruction arrangements, respectively. These non-linear variations in the magnification cause the reconstructed image to be spatially distorted with respect to the original object. The present invention is concerned with a technique for reducing this type of non-linear spatial distortion.

Although it is desirable to reduce or minimize distortion of any type, in many environments non-linear spatial distortion of the reconstructed image of a hologram can be tolerated to a large degree. However, one particular case in which only a small amount of non-linear distortion, at most, can be tolerated is in the system described below for holographically recording color scenes, such as the frames of a color motion picture, for playback over a color television receiver. In this system, the object to be holographically recorded is a transparency including two spatially separated, but corresponding, portions. One of these portions manifests the luminance information of a given scene (e.g. that contained in a single frame of a color motion picture) and the other of these portions manifests in coded form the chrominance information of that scene. During playback, reconstructed images of both the luminance information and the chrominance information are simultaneously picked up by a television camera means coupled by closed circuit to a color television receiver. The television receiver, after separately processing the picked up luminance and chrominance signals, displays a color picture of the given scene on its kineoscope.

The coded chrominance information signal comprises a preselected spatial wavelength modulated in accordance with the color at each point in the given scene. It may or may not, depending upon the particular type of modulation employed, also include a predetermined spatial wavelength for deriving a reference signal. By way of a first example, the preselected signal may be a given spatial wavelength which is phase modulated, in accordance with the color at each point in the given scene, with respect to a reference signal of this same given wavelength; while the predetermined spatial wavelength signal may be just twice the given wavelength of the reference signal and in fixed phase relationship with respect thereto. By way of a second example, the chrominance information signal may be a preselected spatial wavelength whose amplitude, rather than phase, is modulated in accordance with the color at each point in the given scene. In this latter case, no reference signal is required.

It will be seen that regardless of the exact type of modulation employed for the chrominance information signal, non-linear spatial distortion of the image will result in a corresponding distortion in the time frequency of the respective components of the output signal derived by the television camera means in response to the scanning of the image. Since the bandwidth of the signal processing channels of the television receiver are limited, only a relatively small shift in time frequency due to non-linear spatial distortion can be tolerated.

Another aspect of the basic problem of non-linear spatial distortion is that the relative magnification corresponding to each of the two orthogonal dimensions of the image is generally not the same. This results in an undesirable change in the aspect ratio of horizontal dimension to vertical dimension of the image with respect to the aspect ratio of the original given scene. Hence, the aspect ratio of the color display on the kineoscope of the television receiver is changed from that of the original given scene.

In addition, non-linear spatial distortion in the reconstructed image will result in respective corresponding pairs of points in the separated luminance information and the chrominance information, which coincide with each other in the original color scene, being misregistered in the color display thereof on the television kineoscope.

Thus, in the case of the system arrangement just described, reduction of non-linear spatial distortion in the reconstructed image of the hologram to acceptable limits is essential. The present invention is particularly suitable for accomplishing this.

This and other features and advantages of the present invention will become more apparent from the following detailed description taken together with the accompanying drawing, in which.

Figure 1A:
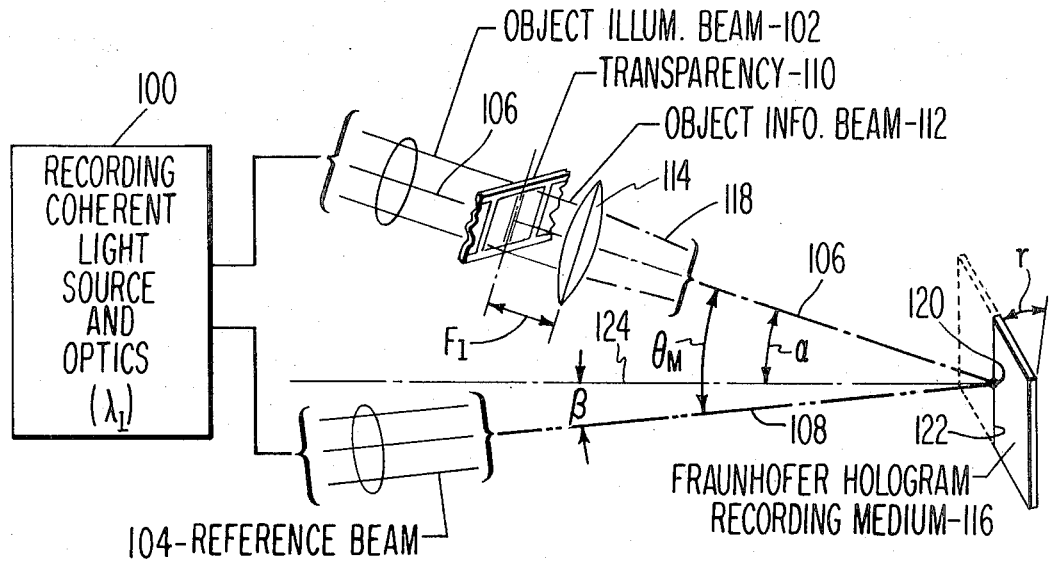
FIG. 1a is a more detailed showing of a portion of FIG. 1.
Figure 1A:
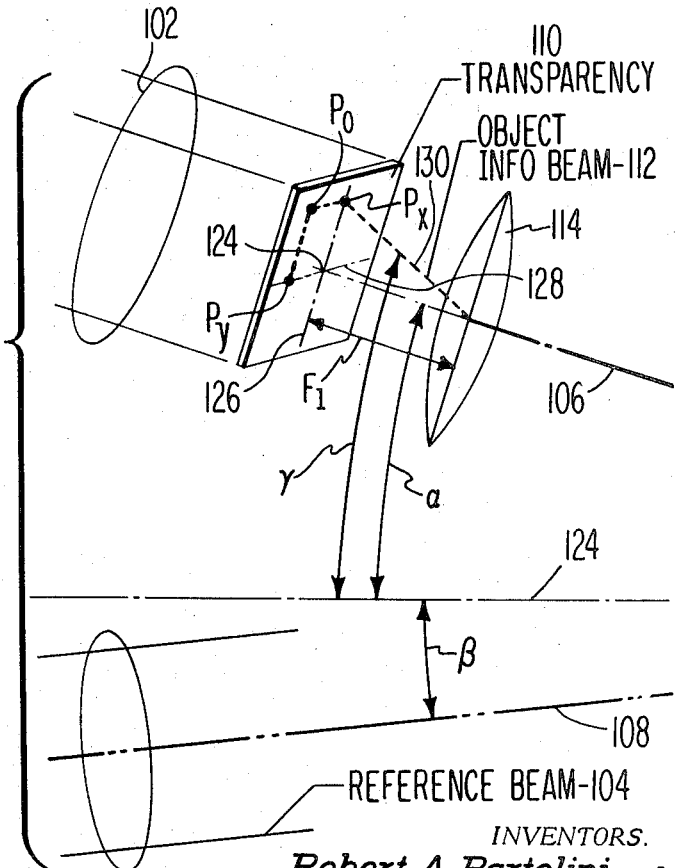
Figure 1B:
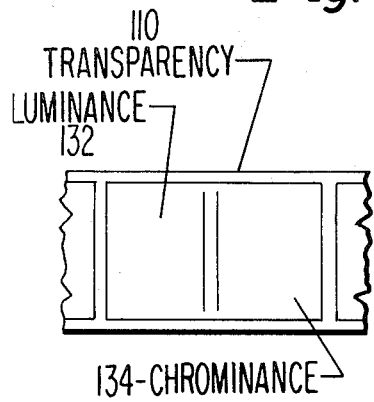
FIG. 1 is a diagrammatic showing in generalized form of the relationship which exists between the object information beam and the reference beam with respect to a recording medium and with respect to each other in the recording of a Fraunhofer hologram.
Figure 2:
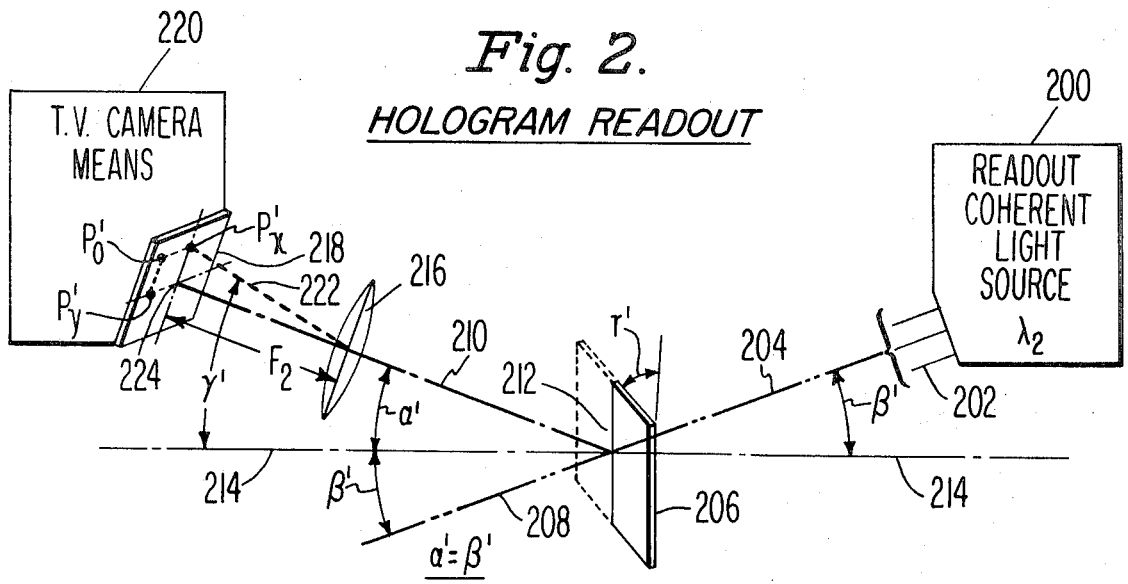
Figure 3:
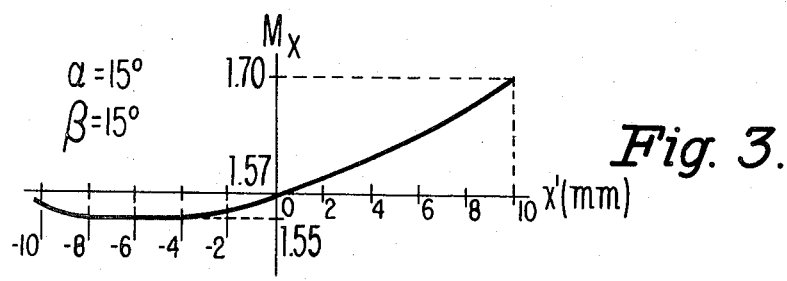
Figure 4:
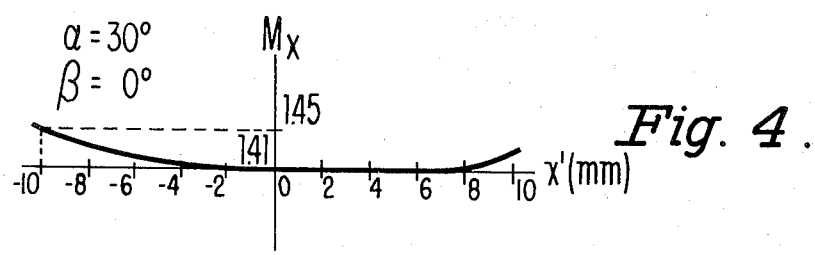
Figure 5:
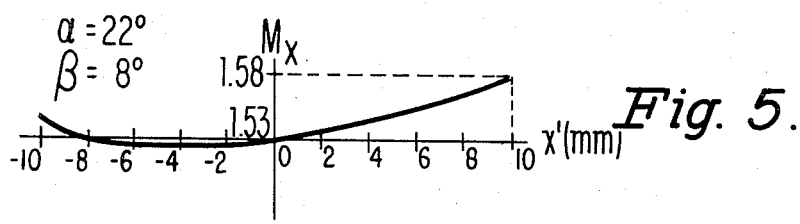

FIG. 1b shows a preferred format for the object information contained in the transparency of FIG. 1, in which the object information comprises separate respective portions manifesting the luminance and chrominance information of a given scene, FIG. 2 is a diagrammatic showing of the apparatus for reading out a Fraunhofer hologram employing wave energy having a different wavelength from that employed in recording the hologram, and FIGS. 3, 4 and 5 are respective graphs showing the relationship between magnification of different points in the reconstructed image as a function of the displacement of that image point from the image optical axis, with the boundary conditions being different for each of FIGS. 3, 4 and 5.

Referring now to FIG. 1, block 100 includes a coherent light source, such as a laser, for generating coherent wave energy at a first wavelength, $\lambda_1$, and optics, such as a beam splitter, beam enlargers, and redundancy means, for deriving angularly-displaced, mutually coherent object illuminating beam 102 and a reference beam 104. Since the details of the arrangement of a laser together with suitable optics for deriving an object illuminating beam and a reference beam which are angularly displaced and mutually coherent with respect to each other are known in the art, and are not required for an understanding of the present invention, in FIG. 1 their presence has been indicated only by block 100.

Object illuminating beam 102 is disposed about object axis 106 and reference beam 104 is disposed about reference axis 108. Transparency 110, which contains the object information, is located in a plane substantially normal to axis 106 and is positioned to be illuminated with object illuminating beam 102. The object information in transparency 110 spatially modulates object illuminating beam 102 to thereby derive object information beam 112 as an output therefrom.

Object information beam 112 is incident on convex lens 114, which is disposed substantially symmetrically about object axis 106. Lens 114 has a focal length $F_1$ and is located beyond transparency 110 by a distance substantially equal to $F_1$. Therefore, transparency 110 lies in the focal plane of lens 114. Lens 114 performs the function, which is conventional in the recording of Fraunhofer hologram, of deriving a virtual object position at infinity.

Fraunhofer hologram recording medium 116 is disposed in the path of the object information wave energy 118 emerging from lens 114, so that a given area (not shown) disposed about point 120 of medium 116 is illuminated by object wave energy 118. Point 120 is the point of intersection of object axis 106 with the surface of medium 116.

Reference beam 104, which is a plane wave, is disposed, as shown, so that reference axis 108 also intersects the surface of medium 116 substantially at point 120. Therefore, object axis 106 and reference axis 108 intersect at point 120 of the surface of medium 116.

Intersecting object and reference axes 106 and 108 define a plane which, in FIG. 1, is assumed to be in the plane of the paper. Although recording medium 116 could be disposed, as is conventional, in a plane normal to the plane defined by the object and reference axes 106 and 108 (i.e. normal to the plane of the paper), it may be angularly rotated through some angle $r$ with respect to the normal to the plane of the paper, as shown in FIG. 1. This results in the plane of the paper intersecting the surface of recording medium 116 in line 122. Central axis 124 is defined as the line in the plane of the paper (i.e. the plane defined by object and reference axes 106 and 108) which is normal to line 122. In the conventional case, not shown, where the surface of recording medium 116 is disposed in a plane normal to the paper, central axis 124 turns out to be the normal to the plane of recording medium 116 passing through point 120.

The angular displacement between object and reference axes 106 and 108 is $\theta_M$. Furthermore, the angular displacement of object axis 106 from central axis 124 is $\alpha$ and the angular displacement of reference axis 108 from central axis 124 is $\beta$. Therefore, in all cases $\theta_M$ is equal to the algebraic sum of $\alpha$ and $\beta$.

Referring now to FIG. 1a, there is shown the relationship between object information beam 112 and transparency 110 of FIG. 1 in more detail (in addition to also showing object illuminating beam 102, reference beam 104 and lens 114 of FIG. 1). Specifically, any generalized point of the object information on transparency 110 will not lie on object axis 106, but will have a predetermined displaced position with respect thereto. If Cartesian coordinates be set up with the origin 124 coincident with the intersection of object axis 106 and the plane of transparency 110, with x axis 126 being coincident with the intersection of the plane of transparency 110 with the plane of the paper (the plane defined by object axis 106 and reference axis 108), and y axis 128 being coincident with the normal to x axis 126 through origin 124 in the plane of transparency 110, the generalized point $P_0$ has an x coordinate along the x axis, $P_x$, and a y coordinate along the y axis, $P_y$, as shown in FIG. 1a. The ray of wave energy 130 connecting point $P_x$ on x axis 126 with the intersection of the center of lens 114 with object axis 106 is angularly displaced from central axis 124 by $\gamma$.

Although the present invention is not limited thereto in practice hologram recording medium 116 is preferably a photoresist. Since photoresists are much more sensitive to relatively short wave light such as blue light, than they are to relatively long wave light, such as red light, the wavelengths $\lambda_1$, of the recording coherent wave energy is preferably light of a relatively short wavelength. The object information in transparency 110 is preferably made up of separate, but corresponding, luminance and chrominance portions of the same color scene. The color scene may be a single frame of a motion picture. In particular, as shown in FIG. 1b, transparency 110 includes spatially separated luminance portion 132 and chrominance portion 134. The luminance portion 132 is normally in uncoded form and, therefore, appears as a black and white rendition of the scene being depicted. On the other hand, the color information of the scene being depicted, manifested by chrominance portion 134, is normally represented in accordance with a predetermined code, which, by way of example, may be a predetermined spatial frequency which has been phase modulated in accordance with the color information in the depicted scene together with a fixed-phase signal from which a phase reference spatial signal may be derived.

In any case, corresponding points in each of luminance portion 132 and chrominance portion 134 are associated with the same point in the original color scene being depicted. Thus, the color information corresponding to a given point in the upper-left of luminance portion 132 is present at a similar point in the upper-left of chrominance portion 134. However, it will be noted that the upper-left of chrominance portion 134 is closer to the center line of transparency 110 than is the upper-left of luminance portion 132. This is true of all points on the left side of luminance portion 132. On the other hand, all points in the vicinity of the right side of luminance portion 132 are closer to the center line of transparency 110 than are the corresponding points on the right side of chrominance portion 134. Thus, any non-linear spatial distortion, which may occur in the recording and playback of the object information in transparency 110, will not only result in spatial distortion of the scene together with a change in the aspect ratio (the ratio of width to height of the scene), but, more important, will result in a misregistration of corresponding points of the luminance portion 132 and the chrominance portion 134 in the reconstructed image thereof.

In practice, it is desirable that object illuminating beam 106 incident on transparency 110 preferably provide a relatively high degree of redundancy of object information in object information beam 112. Also, in practice, it is preferable that object wave energy 118 incident on recording medium 116 be of such a size as to record a redundant hologram which is significantly smaller than the object information itself in transparency 110. These constraints limit the maximum practical focal length of convex lens 114. For instance, in a practical system which was constructed, lens 114 had a focal length, $F_1$, of 50 mm. In this practical system, the angular separation between object axis 106 and reference axis 108, $\theta_M$, was 30° and the recording wavelength $\lambda_1$, was 4416 A.

Referring now to FIG. 2, there is shown in diagrammatic form a preferred embodiment of the type of arrangement which may be employed to playback a recorded hologram, which recorded hologram was recorded employing the arrangement shown in FIGS. 1 and 1a. Specifically, readout coherent light source 200 produces readout beam 202 of plane wave energy having a wavelength $\lambda_2$, which is different from $\lambda_1$. For instance, readout beam 202 may be relatively long wavelength light, such as red light, obtained from a He-Ne laser, rather than the relatively short wavelength light, such as blue light, employed in recording the hologram. Therefore, the wavelength $\lambda_2$ of readout beam 202 is different from the wavelength $\lambda_1$ employed in recording the hologram.

Readout beam 202 is disposed about readout axis 204 located in the plane of the paper. Recorded hologram 206 is disposed in a plane which, in general, may be displaced by some angle $r'$ from the plane normal to the plane of the paper. As shown, hologram 206 is a transmission hologram, rather than a reflective hologram. However, the principles of the present invention apply with equal force to a reflective hologram. Preferably, hologram 206 is a phase hologram hot pressed into a transparent plastic, such as vinyl, by means of a metal master made from an original phase hologram recorded by the arrangement of FIG. 1 in a photoresist recording medium.

Recorded hologram 206 serves to diffract the wave-energy of readout beam 202 incident thereon to produce a plurality of diffraction orders including a zero order disposed about zero order axis 208 and a first order disposed about first order axis 210. The plane defined by zero and first order axes 208 and 210 coincides with the plane of the paper and intersects recorded hologram 206 at line 212. Central axis 214 is a line in the plane of the paper which is normal to line 212. In the conventional case where angle $r'$ is equal to zero, central axis 214 is normal to the plane of recorded hologram 206.

The angle $\beta'$ between central axis 214 and readout axis 204 is chosen to provide a first order diffraction angle $\alpha'$ between first order axis 210 and central axis 214 substantially equal to $\beta'$, as indicated in FIG. 2.

An imaging lens 216, having a focal length $F_2$, is symmetrically disposed about first order axis 210 and is located at a distance $F_2$ from the photosensitive surface 218 of TV camera means 220, so that surface 218 lies in the focal plane of lens 216. Imaging lens 216 is effective in focusing on photosensitive surface 218 a reconstructed real image of the object recorded as a Fraunhofer hologram on hologram 206.

In the case where the recorded object includes spatially separated, but corresponding, luminance and chrominance portions of a given scene, as shown in FIG. 1b, TV camera means 220 may include either two camera tubes or, in the alternative, a camera tube with a split photosensitive surface. In either case, the reconstructed luminance portion of the image and the reconstructed chrominance portion of the image are handled by separate channels of the TV camera means 220 to provide a color picture of the original scene on a color kineoscope display (not shown).

The processing of the images on photosensitive surface 218 by TV camera means 220 is not part of this invention.

As mentioned above, in FIG. 2 the angles $\alpha'$ and $\beta'$ are made equal to each other. The reason for this is to minimize the amount of rotation of the reconstructed image which occurs in response to an incremental amount of twist of the vinyl tape. Although this factor is not directly related to the present invention, the fact that $\alpha'$ equals $\beta$ is indirectly pertinent to the present invention, since it is a constraint which must be taken into account.

The present invention is concerned with non-linear spatial distortion in the reconstructed image. In particular, each point in the original object, such as point $P_O$ in FIG. 1a, will be represented by a corresponding point, such as point $P_O'$ in FIG. 2. Thus, point $P'_x$, along axis $x'$, and point $P'_y$, along axis $y'$, in the reconstructed image of FIG. 2 correspond respectively with points $P_x$ and $P_y$ in FIG. 1a. Consider first corresponding points $P_x$ in FIG. 1a and $P'_x$ in FIG. 2. As shown in FIG. 1a, a line 130 connecting point $P_x$ to the center of lens 114 makes an angle $\gamma$ with respect to central axis 124, while, as shown in FIG. 2, a line 222 connecting point $P'_x$ to the center of lens 216 makes an angle $\gamma'$ with respect to central axis 214.

The relationship between $\gamma'$ and $\gamma$ depends upon such factors as the respective values of focal length $F_1$ and $F_2$, the wavelengths $\lambda_1$ and $\lambda_2$, the respective values of angles $\alpha$, $\beta$, and $\beta'$ (which is equal to $\alpha'$), the displacement $x$ of object point $P_x$ from point 124 (the intersection of object axis 106 and transparency 110), and the displacement $x'$ of image point $P'_x$ from point 224 (the intersection of first order axis 210 and photosensitive surface 218). As mentioned above, in a practical system that was constructed $\lambda_1$ was 4416 A, $F_1$ was equal to 50 mm and $\theta_M$ (which is equal to the sum of $\alpha$ and $\beta$) was equal to 30°. In this same practical system, $\lambda_2$ was 6328 A and the focal length $F_2$ was 53 mm.

The Fraunhofer hologram of a single point, such as point $P_x$ is a simple grating, since the reference beam is a plane wave. This simple grating has a line spacing (or spatial wavelength) $d$ which is related to the angles $\beta$ and $\gamma$ and the wavelength $\lambda_1$ in FIGS. 1 and 1a as follows:

$$(\sin\gamma + \sin\beta/\lambda_1) = 1/d \tag{1}$$

When the recorded hologram is read out with plane-wave readout beam 202 of wavelength $\lambda_2$, as shown in FIG. 2, a diffracted plane wave is formed at angle $\gamma'$, given by:

$$(\sin\gamma^1 + \sin\beta^1/\lambda_2) = 1/d \quad (2)$$

Combining equations (1) and (2), $$(\sin\gamma + \sin\beta/\lambda_1) = (\sin\gamma^1 + \sin\beta^1/\lambda_2) \quad (3)$$

As can be seen from FIG. 1a and FIG. 2, respectively, the following identities hold:

$$\gamma = \alpha + \tan^{-1}(x/F_1) \quad (4)$$

$$\gamma^1 = \alpha^1 + \tan^{-1}(x^1/F_2) \quad (5)$$

Substituting equations (4) and (5) in equation (3) gives $$\sin\left[\alpha + \tan^{-1}\left(\frac{x}{F_1}\right)\right] + \sin\beta$$
$$= \frac{\lambda_1}{\lambda_2}\left[\sin\left(\alpha^1 + \tan^{-1}\left(\frac{x^1}{F_2}\right)\right) + \sin\beta^1\right] \quad (6)$$

As can be seen from equation (6), $x$ is not a linear function of $x'$. Thus, the magnification over the image varies, causing spatial distortion. The magnification, $M_x$, along the $x$ axis is obtained by differentiating equation (6), $$M_x = \frac{dx^1}{dx} = \frac{F_2}{F_1}\frac{\lambda_2}{\lambda_1}\frac{\cos\left(\alpha + \tan^{-1}\left(\frac{x}{F_1}\right)\right)\left[1+\left(\frac{x^1}{F_2}\right)^2\right]}{\cos\left(\alpha^1 + \tan^{-1}\left(\frac{x^1}{F_2}\right)\right)\left[1+\left(\frac{x}{F_1}\right)^2\right]} \quad (7)$$

Due to the constraints which exist, both equations (6) and (7) may be simplified. In particular, as shown in FIGS. 1 and 1a, $\theta_M$ is equal to the sum of $\alpha$ and $\beta$. In order to avoid spectral contamination of the hologram's lower carrier side band, it is desirable to record with the largest possible angle $\theta_M$, the value of $\theta_M$ being limited only by the recording material's resolution capability. Thus, in any given case, $\theta_M$ is a constant. In addition, as indicated in FIG. 2 and as discussed above $\alpha'$ and $\beta'$ are equal to each other. Therefore, taking into account these constraints, equation (6) may be simplified as follows for the mean case, where $x = x' = 0$:

$$\sin\alpha + \sin(\theta_M - \alpha) = (2\lambda_1/\lambda_2)\sin\alpha^1 \quad (8)$$

Or $$\alpha^1 = \sin^{-1}\left\{\frac{\lambda_2}{2\lambda_1}[\sin\alpha + \sin(\theta_M - \alpha)]\right\} \quad (9)$$

Substituting equation (9) in equation (7) eliminates the variable $\alpha'$ and shows that the mean case $M_x$ for a given system is only a function of the variable $\alpha$ and is therefore uniquely determined by specifying only the recording angle $\alpha$.

Consider not the condition that exists along the $y$ axis of FIG. 1a (the direction perpendicular to the $x$ axis) and the $y'$ axis of FIG. 2 (the direction perpendicular to the $x'$ axis).

$$\sin(\tan^{-1}(Y/F_1)) = (\lambda_1/\lambda_2)\sin(\tan^{-1}(Y^1/F_2)) \quad (10)$$

Or $$\frac{y}{\sqrt{y^2+F_1^2}} = \frac{\lambda_1}{\lambda_2}\frac{y^1}{\sqrt{(y^1)^2+F_2^2}} \quad (11)$$

In a practical situation where the maximum value of $y$ is typically smaller than the value $F_1$ (for instance, the maximum value $y$ is typically small relative to the 50 mm. value of $F_1$), so that $y^2 > F_1^2$. Therefore, equation (11) reduces approximately to $$Y'/Y \cong (\lambda_2/\lambda_1)(F_2/F_1) \quad (12)$$

Whether the approximate relationship of equation (12) may be employed or whether the exact relationship of equation (11) must be employed depends on just how large the maximum $y'$ is relative to the focal length $F_2$. In the practical example actually constructed, discussed above, where $F_2$ was 53 mm. the maximum values employed for $y'$ were such that approximate equation (12) could be employed for at least all the more interior points of the image, although exact equation (11) may be required for points at the edge of the image.

The exact magnification $M_y$ derived from equation (11) is shown later in equation (14). However, first the approximate magnification $M_y$ derived from equation (12) will be discussed. The approximate magnification, $M_y$, along the y axis is obtained by differentiating equation (12), $$M_y = dy^1/dy = (\lambda_2/\lambda_1)(F_1/F_2) \quad (13)$$

Equation (13) shows that to the extent that the transparency is small enough to satisfy the $y^2 > F_1^2$ condition, $M_y$ can be considered as constant over the entire image and there is no non-linear spatial distortion in the image y-direction along the y' axis.

In the practical system which was actually constructed, discussed above, $F_1$ had a value of 50 mm; $F_2$ had a value of 53 mm; $\lambda_1$ had a value of 4416 A, and $\lambda_2$ had a value of 6328 A. Substituting these values in equation (13) gives a value for $M_y$, the magnification along the y axis, of 1.52.

Also in the practical system which was actually built, the relationship of the magnification along the x axis, $M_x$, as a function of displacement $x'$ of an image point, such as $P_x'$, from means point 224 in FIG. 2, depends solely on the value of the object beam recording angle $\alpha$ in FIGS. 1 and 1a. This is because reference beam recording angle $\beta$ is always equal to the difference between $\theta_M$ and $\alpha$ [i.e. in the case under discussion (30° $-\alpha$)].

Each of FIGS. 3, 4 and 5 shows a curve of the value of $M_x$ along the x axis as a function of the aforesaid displacement $x'$ in millimeters from the mean point 224 in FIG. 2, taken, respectively, for three different preselected values of the object beam recording angle $\alpha$. In each of FIGS. 3, 4 and 5 the $x'$ dimension of the overall image is about 2 centimeters which is disposed substantially symmetrically about means point 224 of the image.

If, as assumed, the format of the object information is that shown in FIG. 1b, the respective portions of FIGS. 3, 4 and 5 located on one side of the ordinate $M_x$ will correspond with the luminance portion of the reconstructed image, while the respective portions of FIGS. 3, 4 and 5 located on the other side of the ordinate $M_x$ will correspond with the chrominance portion of the reconstructed image.

FIG. 3 shows the case where object axis 106 and reference axis 108 are disposed symmetrically about central axis 124, so that α and β equal to each other and, specifically, are each equal to 15°, since $\theta_M$ has been assumed to be equal to 30°. In this case, as shown in FIG. 3, the value of $M_x$ is 1.57 at point 224 FIG. 2, where $x'$ is equal to zero, and rises quite sharply and continuously to a maximum value of 1.70 when $x'$ is moved in the positive direction (positive being defined by angle γ being greater than the angle α in FIG. 1a) to its most positive value of 10 mm. When the value of $x'$ moves negatively, the value of $M_x$ decreases at a relatively slow rate to a minimum value of 1.55 when $x'$ has a value of about −4mm. It will be noted that $M_x$ in FIG. 3 varies in a highly non-linear manner over a relatively wide range. Further, even the minimum value of $M_x$, 1.55, is somewhat larger than the value of $M_y$, 1.52, (so that the maximum value of 1.70 for $M_x$ is very much larger than the $M_y$ value of 1.52).

FIG. 4 shows the situation when reference axis 108 is coincident with central axis 124, so that object beam recording angle α is equal to all of $\theta_M$ (i.e. 30°). In this case, as shown in FIG. 4, the non-linearity in $M_x$ is relatively small, ranging from a minimum value of 1.41 when $x'$ equals zero to a maximum value of only 1.45 when $x'$ is equal to −10 mm. Although the curve of FIG. 4 provides the conditions for the most nearly constant value of $M_x$, the range of values of $M_x$ from 1.41 to 1.45 are all significantly smaller than the $M_y$ value of 1.52.

It would, of course, be most desirable to obtain a perfectly constant value for $M_x$ just equal to 1.52, the value of $M_y$. Unfortunately, this is not possible. However, by properly selecting the value of α, the variation in the value of $M_x$ can be made quite small (although not as small as that shown in FIG. 4), while at the same time providing a value for $M_x$ which at all times is quite close to the value of $M_y$. FIG. 5 shows this case for the practical system which was actually constructed. In particular, by making α equal to 22° and β equal to 8°, the value of $M_x$ remains very close to 1.53 over a large portion of the range of $x'$ from the value of −10 mm to 10 mm, and rises only to a value approaching its maximum value of 1.58 only in the general vicinity of $x'$ having a value of 10 mm. All these values for $M_x$ are quite close to the $M_y$ value of 1.52.

By choosing an object beam recording angle α of 22°, the image obtained undergoes a minimum overall spatial distortion. This results in a change in the aspect ratio of the image with respect to the aspect ratio of the object which is close to a minimum value, a change in the value of $M_x$ from point to point in the image which is also close to a minimum value, and a misregistration of corresponding points in the chrominance and luminance portions of the image which is also close to a minimum value. Thus, the curve shown in FIG. 5 is the best trade off among all the factors effecting spatial distortion of the image with respect to that of the object.

Because of the complicated mathematics involved, up to now, only points on the axes, such as points $P_x$ and $P_y$ of the object and point $P'_x$ and $P'_y$ of the image, have been discussed and analyzed. However, it can be shown that the principles of the present invention also apply to corresponding points of the object and image, such as points $P_0$ and $P'_0$, which are spaced from both the x and y axes.

In particular, the magnifications $M_y$ and $M_x$ for the x and y components of a generalized point of the image, such as point P', are defined by the following equations:

(14)
$$M_y = \frac{dy^1}{dy} = \frac{\lambda_2}{\lambda_1} \frac{F_2}{F_1} \frac{\cos[\tan^{-1}y/F_1]}{\cos[\tan^{-1}y^1/F_2]} \frac{\left[1+\left(\frac{y^1}{F_2}\right)^2\right]}{\left[1+\left(\frac{y}{F_1}\right)^2\right]}$$

(15)
$$M_x = \frac{dx^1}{dx}$$
$$= \frac{\lambda_2}{\lambda_1} \frac{F_2}{F_1} \frac{\cos[\alpha+\tan^{-1}X/F_1]}{\cos[\alpha^1+\tan^{-1}X/F_2]} \frac{\left[1+\left(\frac{X^1}{F_2}\right)^2\right]}{\left[1+\left(\frac{X}{F_1}\right)^2\right]} \frac{\cos\left[\tan^{-1}\frac{-y}{F_1}\right]}{\cos\left[\tan^{-1}\frac{-y^1}{F_2}\right]}$$

Equations (14) and (15) may be combined into the following single equation:

$$M_x = M_y \frac{\cos\left[\alpha+\tan^{-1}\frac{X}{F_1}\right]}{\cos\left[\alpha'+\tan^{-1}\frac{X'}{F_2}\right]} \frac{\left[1+\left(\frac{X'}{F_2}\right)^2\right]\left[1+\left(\frac{y}{F_1}\right)^2\right]}{\left[1+\left(\frac{X}{F_1}\right)^2\right]\left[1+\left(\frac{y'}{F_2}\right)^2\right]}$$

It can be seen from equation (14) that the magnification $M_y$ of the generalized point is independent of the respective values of $x$, $x'$, α, and α'. Furthermore, for the reasons discussed in connection with equations (10) through (13), so long as $y^2 > F_1^2$, $M_y$ can be considered to be constant over the entire image.

Equations (15) and (16) show that the x component of magnification, $M_x$, the generalized point be dependent on the value of the object beam recording angle α, the readout diffraction angle α', and the values of the λ and λ' component of the generalized point of object and image in addition to the values of the x and x' components of the generalized point of object and image since α' is itself a function of α under the assumed conditions, as discussed in connection with equation (9), α may be eliminated as a variable. By comparing equation (15) to equation (7), it will be seen that $M_x$ for the generalized point is similar to $M_x$ to a point along the x axis, except for the y, y' dependents. Thus, the principles of the present invention for selecting the value of the recording beam angle α to provide an overall spatial distortion of the image which is as close to being minimum, as possible, discussed above in connection with FIGS. 3, 4 and 5, apply with equal force to the general case now under discussion as they do to the special case discussed above where the magnification $M_x$ only along the x axis was considered.

What is claimed is:

1. In a holographic system for recording a Fraunhofer hologram of a color scene employing coherent wave energy having a first predetermined wavelength and thereafter playing back said recorder hologram employing an imaging lens having a preselected focal length and coherent wave energy having a second predetermined wavelength substantially different from said first predetermined wavelength to obtain a reconstructed image from which a color-television display of said color scene may be derived; apparatus for recording said hologram comprising a converging lens having a given focal length defining its focal plane, a color-manifesting object situated in the focal plane of said converging lens, said object comprising first and second spatially separated, but corresponding, portions, one of said object portions defining the luminance information at each point of a particular color scene and the other of said portions defining the corresponding chrominance information at each point of that particular color scene, a wave energy sensitive recording medium located in given spaced relationship with respect to said object and said converging lens, and wave energy illuminating means oriented with respect to said object, said converging lens and said medium to illuminate a given area of said medium directly with a reference beam of coherent wave energy of said first predetermined wavelength which is directed thereto over a first preselected path and to also illuminate both portions of said objects with an object-illuminating plane-wave of coherent wave energy which is mutually coherent with said reference beam to obtain therefrom an object-information beam which is directed through said converging lens along a second preselected path to simultaneous incidence on said given area of said medium with said reference beam, said first and second preselected paths being such that said reference and object-information beams incident on said given area of said medium define a given plane with said object-information beam being disposed at a particular selected angle with respect to a line in said plane which is normal to the intersection of said plane and said medium and with said reference beam being disposed at an angle with respect to said line equal to the difference between a predetermined fixed angle and said particular selected angle, whereby a hologram of said luminance and chrominance portions is recorded on said given area of said medium, said particular selected angle having a value which results in substantially the least misregistration between corresponding points of said luminance and chrominance portions of said reconstructed image obtained during said playback with an imaging lens having said preselected focal length and with coherent wave energy having said second predetermined wavelength.

2. The system defined in claim 1, further including playback apparatus for reconstructing an image of said recorded hologram, said playback apparatus comprising second wave energy means for illumination of said recorded hologram with a plane-wave readout beam of coherent wave energy having said second predetermined wavelength and traveling in a given first direction with respect to said recorded hologram, whereby a first-order diffraction beam is derived from said hologram traveling in a second direction with respect to said first direction, said readout and diffraction beams defining a second given plane, said first and second directions being such that the line in said second given plane perpendicular to the intersection of said second given plane and said recorded hologram bisects the angle therebetween, and said imaging lens being located in the path of said first-order diffraction beam to reconstruct an image of said luminance and chrominance portions from said recorded hologram in the focal plane of said imaging lens.

3. The system defined in claim 2, further including television camera means having a surface sensitive to wave energy of said second predetermined wavelength located in the focal plane of said imaging lens to thereby focus said reconstructed image on said sensitive surface of said television camera means.

4. In a holographic system, playback apparatus employing wave energy having a second predetermined wavelength for playing back a Fraunhofer hologram of a color-manifesting object to obtain a reconstructed image from which a color-television display of said color scene may be derived, wherein said object includes first and second spatially separated, but corresponding, portions, one of said object portions defining the luminance information at each point of the particular color scene and the other of the object portions defining the corresponding chrominance information at each point of that particular color scene, and wherein said hologram was recorded employing (1) a converging lens having a preselected focal length defining its focal plane in which said object was located, (2) employing a wave energy sensitive recording medium located in given spaced relationship with respect to said object and said converging lens, and (3) employing wave energy illuminating means oriented with respect to said object, said converging lens and said medium to illuminate a given area of said medium directly with a reference beam of coherent wave-energy of said first predetermined wavelength which was directed thereto over a first preselected path and to also illuminate both portions of said object with an object-illuminating plane-wave of coherent wave-energy which was mutually coherent with said reference beam to obtain therefrom an object information beam which was directed through said converging lens along a second preselected path to start simultaneous incidence on said given area of said medium with said reference beam, said first and second preselected paths having been such that said reference and object-information beams incident on said given area of said medium defined a given plane with said object information beam having been disposed at a particular selected angle with respect to a line in said plane which is normal to the intersection of said plane and said medium and with said reference beam having been disposed at an angle with respect to said line equal to the difference between a predetermined fixed angle and said particular selected angle; said playback apparatus comprising second wave-energy means for illuminating said recorded hologram with a plane-wave readout beam of coherent wave energy having said second predetermined wavelength and traveling in a given first direction with respect to said recorded hologram, whereby a first-order diffraction beam is derived from said hologram traveling in a second direction with respect to said first direction, said readout and diffraction beams defining a second given plane, said first and second directions being such that the line in said second given plane perpendicular to the intersection of said second given plane and said recorded hologram bisects the angle therebetween, and an imaging lens having a given focal length defining its focal plane located in the path of said first-order diffraction beam to reconstruct an image of said luminance and chrominance portions from said recorded hologram in the focal plane of said imaging lens, said reconstructed image exhibiting a misregistration between corresponding points of its luminance and chrominance portions which is dependent upon the respective values of said first and said second predetermined wavelengths, said preselected and said given focal lengths and said particular selected angle, the value of said particular selected angle employed in recording said hologram having been that which results in substantially the least amount of misregistration between corresponding points of said luminance and chrominance portions of said reconstructed image.

5. The system defined in claim 4, further including television camera means having a surface sensitive to wave energy of said second predetermined wavelength located in the focal plane of said imaging lens to whereby focus said reconstructed image on said sensitive surface of said television camera means.

* * * * *

UNITED STATES PATENT OFFICE
CERTIFICATE OF CORRECTION

Patent No. 3,763,311　　　　　Dated October 2, 1973

Inventor(s) Robert Alfred Bartolini and Dainis Karlsons

It is certified that error appears in the above-identified patent and that said Letters Patent are hereby corrected as shown below:

Column 6, equation (1), that portion of the left-hand side of the equation reading "sin $\beta/\lambda_1$)" should read --sin $\beta)/\lambda_1$--. Column 7, equation (2), the left-hand side of the equation reading "(sin $\gamma^1$ + sin $\beta^1/\lambda_2$)" should read --(sin $\gamma'$ + sin $\beta'$)/$\lambda_2$--; equation (3), that portion of the left-hand side of the equation reading "sin $\beta/\lambda_1$)" should read --sin $\beta)/\lambda_1$-- and the right-hand side of the equation reading "(sin $\gamma^1$ + sin $\beta^1/\lambda_2$)" should read --(sin $\gamma'$ + sin $\beta'$)/$\lambda_2$--; equation (5), $$"\gamma^1 = \alpha^1 + \tan^{-1}(x^1/F_2)"$$

should read $$--\gamma' = \alpha' + \tan^{-1}(x'/F_2)--;$$

equation (6), that portion of the right-hand side of the

UNITED STATES PATENT OFFICE
CERTIFICATE OF CORRECTION

Patent No. 3,763,311      Dated October 2, 1973

Inventor(s) Robert Alfred Bartolini and Dainis Karlsons

It is certified that error appears in the above-identified patent and that said Letters Patent are hereby corrected as shown below:

equation reading
$$"\sin\left(\alpha^1 + \tan^{-1}\left(\frac{x^1}{F_2}\right)\right) + \sin \beta^1"$$
should read
$$--\sin\left(\alpha' + \tan^{-1}\left(\frac{x'}{F_2}\right)\right) + \sin \beta' --;$$

line 22, "x" should read --x'--; line 23, "x'" should read --x--; line 57, "not" should read --now--; equation (7), $$"M_x = \frac{dx^1}{dx} = \frac{F_2}{F_1} \frac{\lambda_2}{\lambda_1} \frac{\cos\left(\alpha + \tan^{-1}\left(\frac{x}{F_1}\right)\right)}{\cos\left(\alpha^1 + \tan^{-1}\left(\frac{x^1}{F_2}\right)\right)} \frac{\left[1 + \left(\frac{x^1}{F_2}\right)^2\right]}{\left[1 + \left(\frac{x}{F_1}\right)^2\right]} \quad "$$

should read $$--M_x = \frac{dx'}{dx} = \frac{F_2}{F_1} \frac{\lambda_2}{\lambda_1} \frac{\cos\left(\alpha + \tan^{-1}\left(\frac{x}{F_1}\right)\right)}{\cos\left(\alpha' + \tan^{-1}\left(\frac{x'}{F_2}\right)\right)} \frac{\left[1 + \left(\frac{x'}{F_2}\right)^2\right]}{\left[1 + \left(\frac{x}{F_1}\right)^2\right]} \quad --;$$

UNITED STATES PATENT OFFICE
CERTIFICATE OF CORRECTION

Patent No. 3,763,311      Dated October 2, 1973

Inventor(s) Robert Alfred Bartolini and Dainis Karlsons

It is certified that error appears in the above-identified patent and that said Letters Patent are hereby corrected as shown below:

equation (8), that portion of the right-hand side of the equation reading "sin $\alpha^1$" should read --sin $\alpha'$--; equation (9), the left-hand side of the equation reading "$\alpha^1$" should read --$\alpha'$--; equation (10), that portion of the left-hand side of the equation reading "$(Y/F_1)$" should read --$(y/F_1)$-- and that portion of the right-hand side of the equation reading "$(Y^1/F_2)$" should read --$(y'/F_2)$--; and equation (11), that portion of the right-hand side of the equation reading $$ " \frac{y^1}{\sqrt{(y^1)^2 + F_2^2}} " $$

should read $$ -- \frac{y'}{\sqrt{(y')^2 + F_2^2}} -- . $$

Column 8, equation (12), the left-hand side of the equation reading "$Y'/Y$" should read --$y'/y$--; equation (13), the central

UNITED STATES PATENT OFFICE
CERTIFICATE OF CORRECTION

Patent No. 3,763,311  Dated October 2, 1973

Inventor(s) Robert Alfred Bartolini and Dainis Karlsons

It is certified that error appears in the above-identified patent and that said Letters Patent are hereby corrected as shown below:

portion of the equation reading

" $\frac{dy^1}{dy}$ " should read -- $\frac{dy'}{dy}$ --;

line 43, "means" should read --mean--; and line 56, "means" should read --mean--. Column 10, equation (14), $$"M_y = \frac{dy^1}{dy} = \frac{\lambda_2}{\lambda_1} \frac{F_2}{F_1} \frac{\cos\left[\tan^{-1} y/F_1\right]}{\cos\left[\tan^{-1} y^1/F_2\right]} \frac{\left[1 + \left(\frac{y^1}{F_2}\right)^2\right]}{\left[1 + \left(\frac{y}{F_1}\right)^2\right]} "$$

should read $$--M_y = \frac{dy'}{dy} = \frac{\lambda_2}{\lambda_1} \frac{F_2}{F_1} \frac{\cos\left[\tan^{-1} y/F_1\right]}{\cos\left[\tan^{-1} y'/F_2\right]} \frac{\left[1 + \left(\frac{y'}{F_2}\right)^2\right]}{\left[1 + \left(\frac{y}{F_1}\right)^2\right]} --;$$

UNITED STATES PATENT OFFICE
CERTIFICATE OF CORRECTION

Patent No. 3,763,311     Dated October 2, 1973

Inventor(s) Robert Alfred Bartolini and Dainis Karlsons

It is certified that error appears in the above-identified patent and that said Letters Patent are hereby corrected as shown below:

equation (15), $$"M_x = \frac{dx^1}{dx}$$

$$= \frac{\lambda_2}{\lambda_1} \frac{F_2}{F_1} \frac{\cos[\alpha + \tan^{-1} X/F_1]}{\cos[\alpha^1 + \tan^{-1} X/F_2]} \frac{\left[1 + \left(\frac{X^1}{F_2}\right)^2\right] \cos\left[\tan^{-1} \frac{y}{F_1}\right]}{\left[1 + \left(\frac{X}{F_1}\right)^2\right] \cos\left[\tan^{-1} \frac{y^1}{F_2}\right]}"$$

should read $$--M_x = \frac{dx'}{dx}$$

$$= \frac{\lambda_2}{\lambda_1} \frac{F_2}{F_1} \frac{\cos[\alpha + \tan^{-1} x/F_1]}{\cos[\alpha' + \tan^{-1} x'/F_2]} \frac{\left[1 + \left(\frac{x'}{F_2}\right)^2\right] \cos\left[\tan^{-1} \frac{y}{F_1}\right]}{\left[1 + \left(\frac{x}{F_1}\right)^2\right] \cos\left[\tan^{-1} \frac{y'}{F_2}\right]} --;$$

UNITED STATES PATENT OFFICE
CERTIFICATE OF CORRECTION

Patent No. 3,763,311　　　　Dated October 2, 1973

Inventor(s) Robert Alfred Bartolini and Dainis Karlsons

It is certified that error appears in the above-identified patent and that said Letters Patent are hereby corrected as shown below:

line 15, insert --(16)--; equation (16), $$"M_x = M_y \frac{\cos\alpha + \tan^{-1}\frac{x}{F_1}\left[1+\left(\frac{x'}{F_2}\right)^2\right]\left[1+\left(\frac{y}{F_1}\right)^2\right]}{\cos\alpha' + \tan^{-1}\frac{x'}{F_2}\left[1+\left(\frac{x}{F_1}\right)^2\right]\left[1+\left(\frac{y'}{F_2}\right)^2\right]}"$$

should read $$--M_x = M_y \frac{\cos\left(\alpha + \tan^{-1}\frac{x}{F_1}\right)}{\cos\left(\alpha' + \tan^{-1}\frac{x'}{F_2}\right)} \frac{\left[1+\left(\frac{x'}{F_2}\right)^2\right]\left[1+\left(\frac{y}{F_1}\right)^2\right]}{\left[1+\left(\frac{x}{F_1}\right)^2\right]\left[1+\left(\frac{y'}{F_2}\right)^2\right]} --;$$

and line 35, "$\alpha$" should read --$\alpha'$--.

Signed and sealed this 7th day of May 1974.

(SEAL)
Attest:

EDWARD M. FLETCHER, JR.
Attesting Officer

C. MARSHALL DANN
Commissioner of Patents